United States Patent [19]

Hube

[11] Patent Number: 5,640,647
[45] Date of Patent: Jun. 17, 1997

[54] METHOD AND APPARATUS FOR SELECTIVELY SCANNING PAGES WITHIN A DOCUMENT STACK

[75] Inventor: Randall R. Hube, Rochester, N.Y.

[73] Assignee: Xerox Corporation, Stamford, Conn.

[21] Appl. No.: 562,667

[22] Filed: Nov. 27, 1995

[51] Int. Cl.$^6$ .................................................. G03G 21/00
[52] U.S. Cl. .................................................. 399/84; 399/366
[58] Field of Search .................................. 355/208, 313, 355/314, 325, 311; 382/317; 399/84, 366

[56] References Cited

U.S. PATENT DOCUMENTS

| | | | |
|---|---|---|---|
| 4,283,621 | 8/1981 | Pembroke | 355/64 X |
| 4,757,348 | 7/1988 | Rourke et al. | 358/300 X |
| 4,862,222 | 8/1989 | Staude et al. | 355/40 |
| 4,876,571 | 10/1989 | Nakamura et al. | 355/210 |

FOREIGN PATENT DOCUMENTS

| | | |
|---|---|---|
| 61-294464 | 12/1986 | Japan . |
| 62-201473 | 9/1987 | Japan . |
| 64-578 | 1/1989 | Japan . |
| 4-9963 | 1/1992 | Japan . |

*Primary Examiner*—Nestor R. Ramirez
*Attorney, Agent, or Firm*—Michael J. Nickerson

[57] ABSTRACT

A scanning system enables a user to nondestructively mark certain pages in a document stack and cause these page to be skipped during the scanning on a digital scanner. The pages of the document stack to be skipped are marked with a small adhesive backed label placed at a pre-defined location on the page by the user. The label is large enough to carry a simple, but unique image (machine-readable code) that can be read by a single sensor. The machine-readable code may be a barcode, glyph, color pattern, or reflective/nonreflective pattern, etc. The label's adhesive is such that it can be easily removed from the document stack without destroying the integrity of the page to which it was attached. In operation, the scanner utilizes a label sensor located before the scanning station/platen area so as to sense the skip label prior to the actual image capturing operation. Upon detection of the skip label on a particular document page by the upstream sensor, a microprocessor instructs the scanner to bypass the scanning of that page.

12 Claims, 2 Drawing Sheets

METHOD AND APPARATUS FOR SELECTIVELY SCANNING PAGES WITHIN A DOCUMENT STACK

FIELD OF THE PRESENT INVENTION

The present invention is directed to a method and system for scanning a subset of pages from an original document without jeopardizing the integrity of the original document. More specifically, the present invention is directed to a method and apparatus for allowing a user to simply mark specific pages in an original document stack so as to cause these pages to be skipped during scanning on a production scanner.

BACKGROUND ON THE PRESENT INVENTION

Hard copy original documents usually exist as a stack of originals in some logical sequence that is relevant for the document stack as it was originally created. For example, a sequence of a document stack might represent the pages of a book or report from beginning to end, a set of transaction documents in date order for a given period, or a collection of information in any order as sorted by the compiler. When republishing or reprinting of the document stack, or portions thereof, is to be done, a considerable amount of care must be taken to ensure that the original document's integrity is maintained; i.e., the page order, the condition of the original document, etc. Without this integrity, the value of the document for subsequent use may be greatly reduced. Conventionally, publishing system operations maintain the original document's integrity by utilizing one of the following three methods.

In a first method, the user physically and carefully separates the original document into those pages that are of interest (stack or stacks of interest) and those that are not (remaining stack or stacks). If the separation process is not simple; for example, there are many dispersed pages to be extracted or adequate page numbering does not exist; the user may insert tags, colored marker sheets or other such indicators into the remaining stack to show where the pages of interest should be returned. Alternatively, the user may lay out the remaining stacks and sections on large work surface to convey a logical sequence. After scanning the stack or stacks of interest, the user then manually reassembles all the original document stacks back into the original sequence.

In a second method, the user never physically divides the original document stack. Instead, the user loads the entire originally document stack onto a digital scanner, scans all the pages (those of interest and those not of interest), and then, using post editing functions, deletes all the unwanted pages. In other words, in this system, the user is allowed to view each page after it is scanned to determine whether to keep it or delete it from the stack of documents to be printed. This viewing and determination process may be carried out after the entire stack is scanned or after each page of the stack is scanned. This method allows the user to capture each page in the scanning process and selectively delete the undesired pages prior to printing.

A third method involves loading the entire document stack onto a digital scanner. However, prior to scanning, the user preprograms, via a user interface or control panel, which pages are to be scanned and which are to be skipped. Only those of interest are actually scanned by the system. Although the rest are passed through the scanner, the actual image capture operation is bypassed.

Each of the method described above are usable; however, each of these methods are far from ideal. More specifically, the first method is time consuming for the user and depends heavily on the user's diligence and organizational skills. Any mistake can result in the lost of the original document's integrity, or worse, portions of the original document being incorrectly reassembled with other portions.

On the other hand, the second described method avoids the problem of incorrect reassembly, but is inefficient. In this method, time is lost scanning or processing unwanted page images. Moreover, considerable amount of time is lost by this system electronically displaying images for the user to review and to make a determination. The electronic display method also utilizes considerable system memory that can be available for other system activities.

Lastly, the third described method avoids most of the problems with the prior two methods, but it introduces a new problem, the user must carefully count all the pages in the original document and carefully note the location of all the pages to scan. Besides the time it takes to do the counting, any error in counting; e.g., losing track or skipping a page; will cause the wrong pages to be captured. Although some documents may already be page numbered, that page numbering can only be used if it coincides perfectly with the physical page number of the stack. Often, this is not the case, as there are likely to be title pages, copyright pages, cover memos, inserts, etc. that are not included in the original page numbering scheme.

Therefore, it is desirable to provide a system for scanning a subset of pages from an original document stack without putting at risk or jeopardizing the integrity of the original document stack. Moreover, it is desirable that the scanning system captures the actual images to be republished or reprinted in an efficient and reliable manner that avoids the problems discussed above with the existing conventional methods.

SUMMARY OF THE PRESENT INVENTION

One aspect of the present invention is a system for selectively scanning pages in a document stack. This system includes a label attached to one of the pages of the document stack, a label sensor, and a document handling system to enable pages from the document stack to pass over the label sensor. This system further includes a scanning system to capture images from the pages of the document stack, and processor means for preventing the scanning system from capturing images from a certain page of the document stack when the label sensor senses a label thereon.

A second aspect of the present invention is a method for selectively scanning pages in a document stack. This method attaches a label to one of the pages of the document stack and moves each page of the document stack pass a label sensor and a scanning system. The method further determines whether a label is attached to the page and captures an image from the page when it is determined that no label is attached thereto.

Another aspect of the present invention is a label for attaching to a page in a document stack. This label includes a printable substrate and an adhesive coating on one side of the printable substrate. The printable substrate has printed thereon a machine-readable code which informs a scanning system of a parameter related to a scanning operation.

Further objects and advantages of the present invention will become apparent from the following descriptions of the various features of the present invention.

BRIEF DESCRIPTION OF THE DRAWINGS

The following is a brief description of each drawing used in describing the present invention, and thus, the drawings are being presented for illustrative purposes only and should not be limitative of the scope of the present invention, wherein.

DETAILED DESCRIPTION OF THE DRAWINGS

Figure 1:
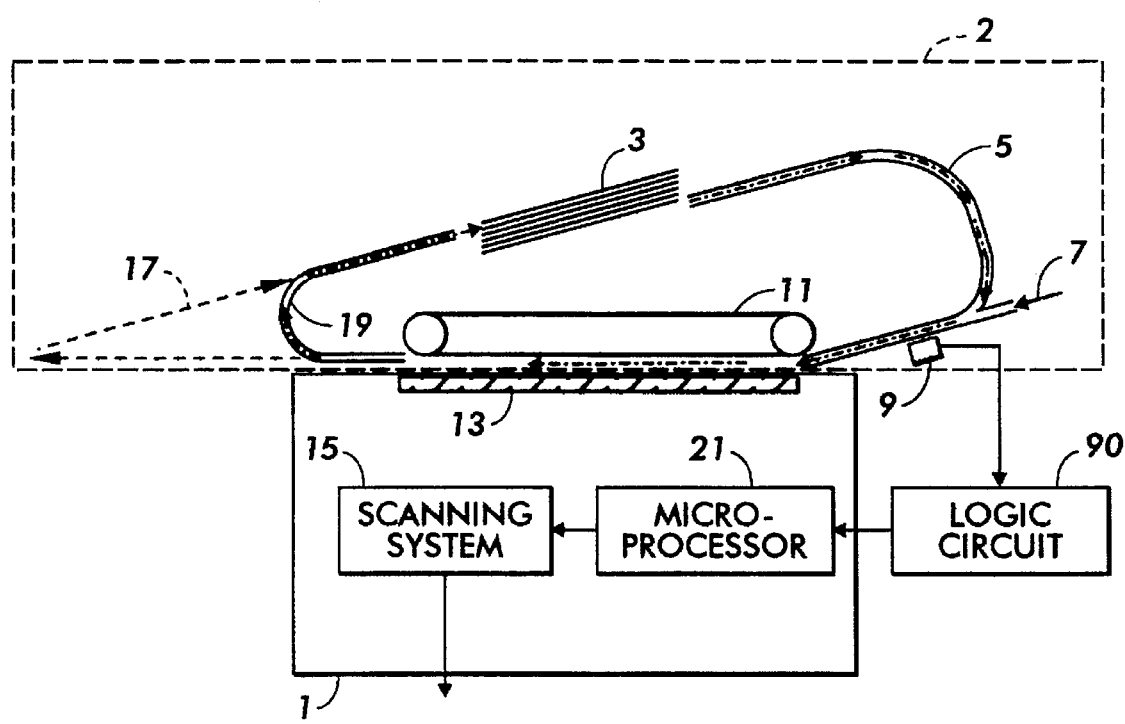
FIG. 1. is a block diagram illustrating a scanning system according to the concepts of the present invention.

The following is a detailed description of the drawings illustrated in the present invention. In the description, as well as in the drawings, like reference numerals represent like devices, circuits, or equivalent circuits performing the same or equivalent functions.

As noted above, FIG. 1 illustrates a digital scanner 1 which implements the concepts of the present invention. In this digital scanner 1, a document handler 2 transports pages of a document stack through a scanning position (in this embodiment, the scanning position is a predetermined location on a glass platen 13) so that the images on the pages can be captured by a scanning system 5. More specifically, the original document stack is placed in a tray 3 from which individual pages of the document stack are feed along a document path 5 past a label sensor 9. The label sensor 9 is positioned to look for a label on a particular portion of the page. The label contains machine-readable codes that corresponds to a parameter of a scanning operation. In the preferred embodiment of the present invention, the label contains machine-readable codes that corresponds to a skipping (non-scanning) operation.

Figure 2:
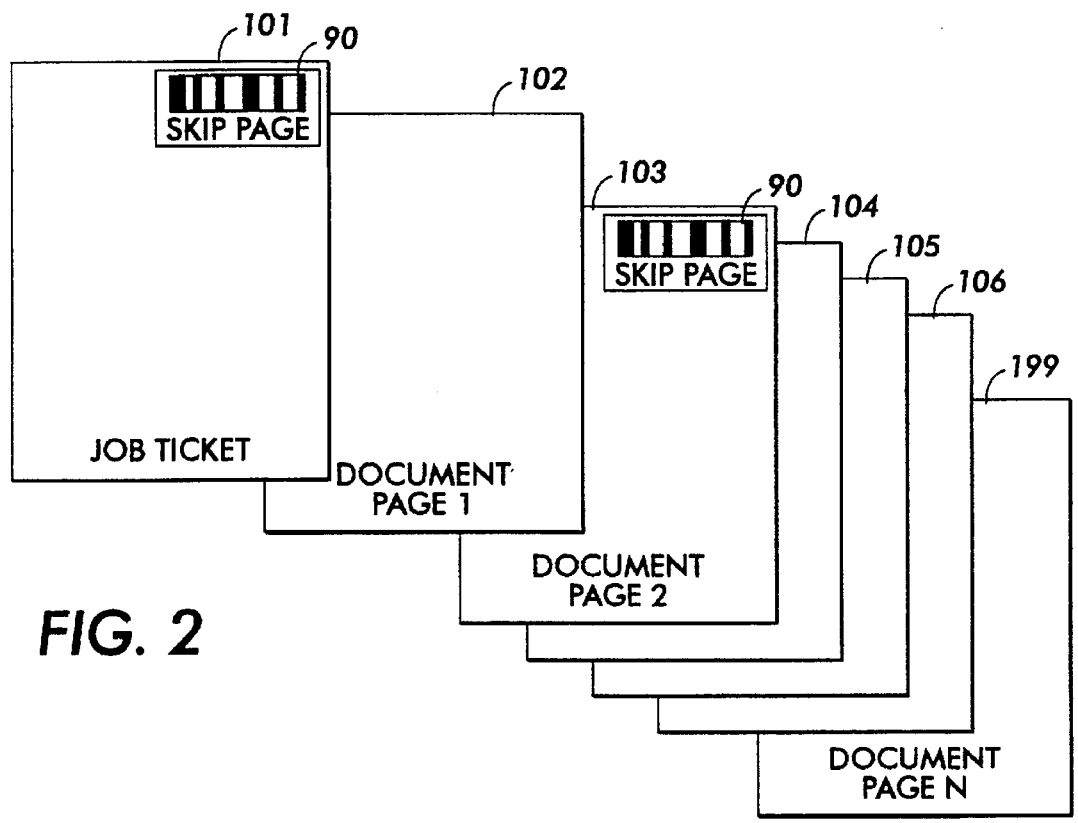
FIG. 2. is an illustration of a document stack utilizing one embodiment of the present invention.

In other words, as illustrated in FIG. 2, the document stack may include pages, 101, 102, 103, 104, 105, 106, and 199. In this example, document page 101 may be a job ticket; document page 102 may be page 1 of the document stack; document page 103 may be page 2 of the document stack; and document page 199 may be page N of the document stack. Document page 101 and document page 103 have labels 90 attached at a predetermined location on the page.

These labels 90 include a machine-readable code which when read by the label sensor 9 causes the scanning system 15 to skip the image capture operation with respect to these document pages. In other words, when the label 90 is attached to one of the pages in the document stack, the digital scanner 1 merely passes this page of the document stack through the scanning position without the scanning system 15 capturing the image thereon.

When the lens sensor 9 operating in conjunction with image processing and detection logic circuit 90 senses such a label as illustrated in FIG. 2, a signal is sent from image processing and detection logic circuit 90 the to a microprocessor 21 which controls the image capture operations of the scanning system 15. As noted above, when lens sensor 9 and the image processing and detection logic circuit 90 detects such a label and signals the microprocessor, the microprocessor 21 causes the scanning system 15 to refrain from any image capture operation with respect to this page of the document stack as the page is passed over the glass platen 13 by a document transport device 11. In this embodiment of the present invention, the glass platen area 13 represents the scanning station for the digital scanner. Upon leaving the scanning station 13, the page of the document stack follows the document path 19 back to the document tray 3.

The document handler 2 may also include an inverter path 17 which provides duplex scanning and a side feeder 7 which enables the scanning of unusual sized documents.

Figure 3:
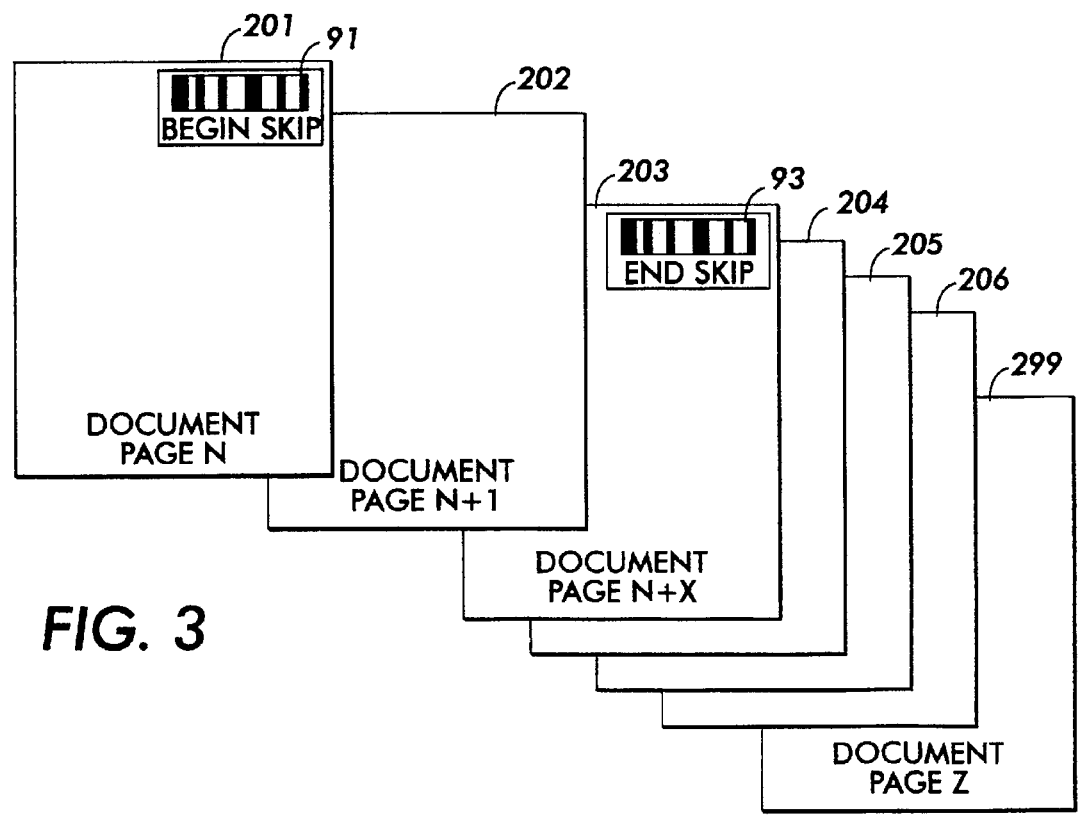
FIG. 3. is an illustration showing a document stack utilizing another embodiment of the present invention.

FIG. 3 illustrates a document stack having label attached to certain pages therein. In this embodiment of the present invention, the document stack includes document page 201, document page 202, document page 203, document page 204, document page 205, document page 206, and document page 299. As illustrated in FIG. 3, document page 201 represents the $N^{th}$ page of the document, while document page 202 represents the N+1 page of the document. Moreover, document page 203 represents the N+X page of the document stack, and document page 299 represents the $Z^{th}$ page of the document stack.

With respect to the document page 201, a label 91 is attached at a predetermined location on the document page. This label 91 has printed thereon a machine-readable code which when read by the lens sensor 9 instructs the microprocessor 21 to begin the skipping (non-scanning) operation with respect to the scanning system 13. In other words, when the lens sensor 9 detects a label having the machine-readable code printed thereon indicating a beginning of a skip operation, the digital scanner will skip the image capture operation with respect to this document page and every document page following thereafter until an end skipping operation instruction is received. Alternatively, when the lens sensor 9 detects a label having the machine-readable code printed thereon indicating a beginning of a skip operation, the digital scanner will start the skipping of the image capture operation with the document page following the document page having the label thereon until an end skipping operation instruction is received. Such an end skipping operation instruction can be conveyed to the digital scanner by label 93.

As illustrated in FIG. 3, label 93 is attached to the document page 203 at predetermined location. This label 93 has printed thereon a machine-readable code which indicates to the microprocessor 21 the end of the skipping operation. The microprocessor 21 causes the scanning system 13 to skip the image capture operation with respect to this document page (document page 203) and begin the image capture operation for pages in the document stack that follow therefrom. Alternatively, the microprocessor 21 causes the scanning system 13 to resume the image capture operation with respect to this document page (document page 203) and for pages in the document stack that follow therefrom.

Thus, as illustrated in FIG. 3, the labels can be utilized in delineating a mass skipping operation wherein the image capture operation is suppressed for the document pages having the labels attached thereto and any document pages residing between the two pages having the labels attached thereto.

As described above, the present invention provides the user with the opportunity to nondestructively mark certain pages in a document stack and cause these page to be skipped during the scanning on a digital scanner. It is noted that such a system also can be utilized in a facsimile system or other reprographic system.

As illustrated in FIGS. 2 and 3, the pages of the document stack to be skipped are marked with a small adhesive backed label placed at a pre-defined location on the page by the user. The label need only be large enough to carry a simple, but unique image that can be read by a single sensor. The machine-readable code may be a barcode, glyph, color pattern, or reflective/nonreflective pattern, etc. The label's adhesive is such that it can be easily removed from the document stack without destroying the integrity of the page to which it was attached. More specifically, the adhesive on the label is sufficiently strong enough to hold the label without risk of separation from the document page even through many scanning cycles, yet allow removability by the user without harm to the document. Such an adhesive is available from 3M Corporation and is commonly found on the Post-It-Note™ product.

In operation, the present invention utilizes a label sensor located before the scanning station/platen area so as to sense the skip label prior to the actual scanning of the document page or image capturing operation. Upon detection of the skip label on a particular document page by the upstream sensor, the microprocessor instructs the scanner to bypass the scanning of that page. Moreover, if it is possible, the document handler may also be instructed not even to pause with the document on the platen. By not stopping the document on the platen and avoiding the need to scan the page, considerable time and resources can be saved.

Additionally, as illustrated in FIG. 3, label codes can be utilized to simplify the process for skipping a large range of papers. More specifically, as illustrated in FIG. 3, the use of start skip and end skip label codes allows scanning to be skipped over many continuous pages without applying labels on each and every page. If a multiple code scheme is used, the labels would need to contain human readable information to indicate the type of command encoded on the label.

Although the present invention has been described in detail above, various modifications can be implemented without departing from the spirit of the present invention. For example, the preferred embodiment of the present invention has been described with respect to a platen scanning apparatus; however, the platen scanning system can be replaced with a constant velocity transport system wherein the scanning system is stationary and the document page to be scanned is passed over the scanning system so as to provide the relevant movement between the scanning system and the document page. In such a system, the document pages are continually moving past the scanning station so as to save time in the scanning process.

Moreover, the present invention has been described with respect to a digital scanner. However, it is contemplated by the present invention that the selective scanning routine can be utilized in a light lens or analog copier system. More specifically, in such an analog or light lens copier system, the microprocessor 15 would prevent the illumination of the document as it passes the scanning station, thereby preventing any image formation or development upon the photosensitive member or photoreceptor. In contrast, in the digital scanner, the microprocessor 15 either prevents the image data formed at the CCD sensor or full width array from being downloaded into the digital image processing system or actual scanning (illumination and image data generation) of the page of the document stack.

Furthermore, the present invention has been described with respect to a skipping or non-scanning operation. However, the labels can be used to convey other such information to the scanner. For example, the labels could instruct the scanner to rotate the image, crop the image, reduce or enlarge the image, etc.

Lastly, the present invention has been described with respect to a recirculating document handling system. However, the concepts of the present invention are readily implemented with any type of document handling system which enables the pages of the document stack to pass through the scanning station and to be restacked in the same or different area.

In recapitulation, the present invention provides a scanning system which enables the user to selectively skip scanning of certain pages within a document stack while maintaining the original document stack's integrity. Moreover, the present invention enables the selective scanning operations without wasting system resources on unwanted images and does not require any post image capture review or editing of the images. The present invention also provides a method which is simple and not prone to user error in setting up a job which requires selective scanning of certain page(s) within a document stack. Lastly, the programming of the page skip routine for a particular document stack can be easily retained by leaving the labels on the original document pages when storing.

While the present invention has been described with reference to various embodiment disclosed above, it is not to be confined to the details set forth above, but is intended to cover such modifications or changes as may fall within the scope of the attached claims.

What is claimed is:

1. A system for selectively scanning pages in a document stack, comprising:

labels to be attached to one or more of the pages within the document stack;

a label sensor to sense a presence of a label on a page within the document stack;

a scanning system to capture images from the pages of the document stack;

a document handling system to enable pages from the document stack to pass over said label sensor and said scanning system; and processor means, operatively connected to said label sensor and said scanning system, for preventing said scanning system from capturing an image from a page within the documents stack having a label attached thereto without interrupting a scanning process of a remainder of the document stack and for enabling said scanning system to capture an image from a page within the document stack that is without a label attached thereto.

2. The system as claimed in claim 1, wherein said label contains machine-readable code printed thereon.

3. The system as claimed in claim 1, wherein said label contains barcodes printed thereon.

4. The system as claimed in claim 1, wherein said label contains glyphs printed thereon.

5. The system as claimed in claim 1, wherein said scanning system is a platen scanning system.

6. The system as claimed in claim 1, wherein said scanning system is a constant velocity transport scanning system.

7. The system as claimed in claim 1, wherein said label is nondestructively removable.

8. A system for selectively scanning pages in a document stack, comprising:

labels to be attached to one or more of the pages within the document stack, one label being printed thereon with a machine-readable code indicating a beginning of a skip operation;

a label sensor to sense a presence of a label on a page within the document stack;

a scanning system to capture images from the pages of the document stack;

a document handling system to enable pages from the document stack to pass over said label sensor and said scanning system; and processor means for preventing said scanning system from capturing the image from the page having the label indicating the beginning of the skip scanning operation attached thereto and for preventing said scanning system from capturing the image from any page following thereafter when said label sensor senses the label indicating the beginning of the skip scanning operation.

9. A system for selectively scanning pages in a document stack, comprising:

labels to be attached to two or more of the pages within the document stack, one label being printed thereon with a machine-readable code indicating a beginning of a skip operation and the other label being printed thereon with a machine-readable code indicating an ending of the skip operation;

a label sensor to sense a presence of a label on a page within the document stack;

a scanning system to capture images from the pages of the document stack;

a document handling system to enable pages from the document stack to pass over said label sensor and said scanning system; and processor means for preventing said scanning system from capturing the image from the page having the label indicating the beginning of the skip scanning operation attached thereto when said label sensor senses the label indicating the beginning of the skip scanning operation and for preventing said scanning system from capturing the image from any page following thereafter until said label sensor senses the label indicating the ending of the skip scanning operation.

10. A method for selectively scanning pages in a document stack, comprising the steps of:

(a) attaching labels to one or more of the pages within the document stack;

(b) moving each page of the document stack pass a label sensor and a scanning system;

(c) determining whether a label is attached to a page;

(d) capturing an image from the page when it is determined that no label is attached thereto; and (e) passing the page through the scanning station without allowing image capture when it is determined that the label is attached thereto without interrupting a scanning process of a remainder of the document stack.

11. The method as claimed in claim 10, wherein one of the labels has printed thereon a machine-readable code indicating a beginning of a skip scanning operation;

said step (e) passes the page through the scanning station without allowing image capture when it is determined that the label has a machine-readable code indicating the beginning of a skip scanning operation is attached thereto and passes any following pages through the scanning station, without interrupting a scanning process of a remainder of the document stack, without allowing image capture of the remaining pages of the document stack eventhough the remaining pages are without labels attached thereto.

12. The method as claimed in claim 10, wherein the other label has printed thereon a machine-readable code indicating an ending of the skip scanning operation;

said step (e) passes the page through the scanning station without allowing image capture when it is determined that the label has a machine-readable code indicating the beginning of a skip scanning operation is attached thereto and passes any following pages through the scanning station, without interrupting a scanning process of a remainder of the document stack, without allowing image capture of the remaining pages of the document stack eventhough the remaining pages are without labels attached thereto until it is determined that a label having a machine-readable code indicating the ending of the skip scanning operation is attached to one of the following pages.

* * * * *